United States Patent [19]

Saha

[11] 4,068,866
[45] Jan. 17, 1978

[54] STAB-TYPE JOINT FOR SMOOTH END OR FLARELESS PIPE

[75] Inventor: Narayan C. Saha, Decatur, Ill.

[73] Assignee: Mueller Co., Decatur, Ill.

[21] Appl. No.: 670,153

[22] Filed: Mar. 25, 1976

[51] Int. Cl.$^2$ .............................................. F16L 17/00
[52] U.S. Cl. ................................... 285/105; 285/323; 285/375
[58] Field of Search ............... 285/105, 104, 340, 375, 285/267, 113, 323

[56] References Cited

U.S. PATENT DOCUMENTS

| 1,434,631 | 11/1922 | Reynolds | 285/267 X |
|---|---|---|---|
| 2,017,994 | 10/1935 | Spang | 285/105 |
| 2,533,059 | 12/1950 | Shaffer | 285/375 X |
| 2,848,256 | 8/1958 | Tyler | 285/375 X |
| 3,150,886 | 9/1964 | Briegel et al. | 285/375 X |
| 3,195,931 | 7/1965 | Braunagel | 285/375 X |
| 3,724,880 | 4/1973 | Seiler | 285/105 |
| 3,815,940 | 6/1974 | Luckenbill | 285/105 |

Primary Examiner—Thomas F. Callaghan
Attorney, Agent, or Firm—Cushman, Darby & Cushman

[57] ABSTRACT

A joint for connecting a smooth wall pipe to fittings or other pipes, the joint including a hollow body member having a passageway therethrough, a split gripper ring positioned and movable axially within the passageway, an elastomeric sealing ring also positioned and movable axially within the passageway and means for axially urging the gripper ring and the sealing ring apart whereby the gripper ring has improved initial grip on the pipe upon insertion of the same and the sealing ring has improved sealing characteristics over a range of positive and negative pressures and over a hot and cold temperature range. The external configuration of the split gripper ring cooperates with the internal configuration of the passageway so that the pipe can be installed axially into the body member but when pulled outwardly of the body member the gripper ring is further actuated from its initial gripping action to prevent removal of the pipe. The sealing ring is provided with a load on the same at all times whereby it has an initial sealing function upon insertion of the pipe and also maintains this sealing function despite subsequent disturbances of the sealing ring by movement of the pipe. The means urging the sealing ring and the gripper ring axially apart also functions to make out of round pipe more round upon insertion so that the position of the sealing ring is not unduly disturbed from its seat.

18 Claims, 11 Drawing Figures

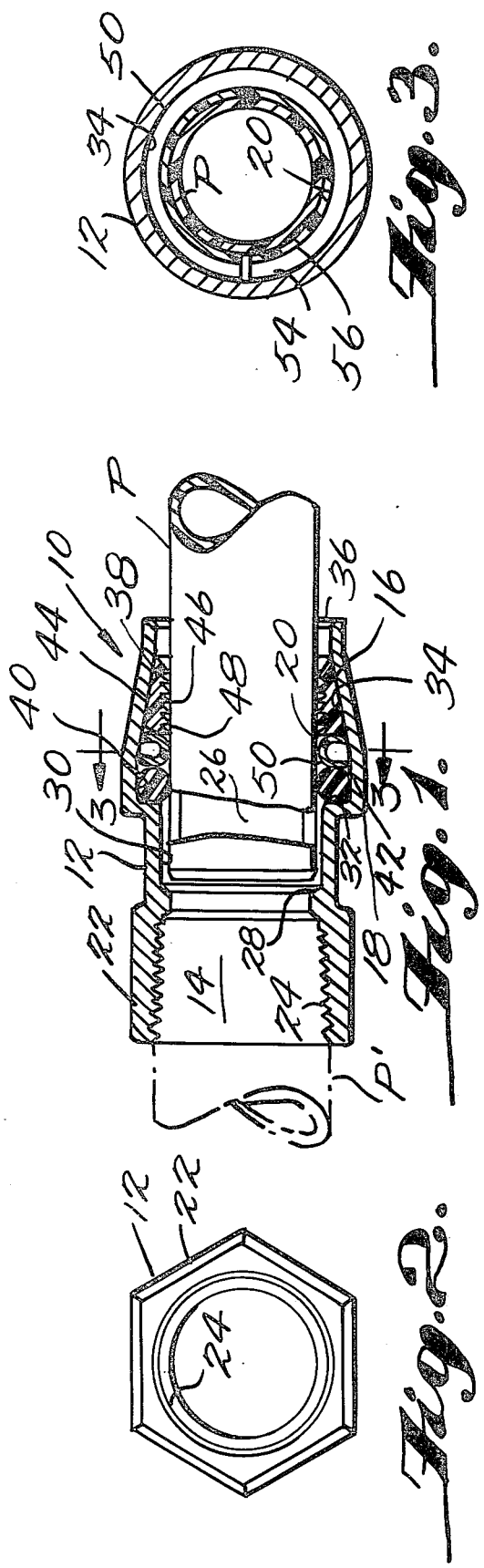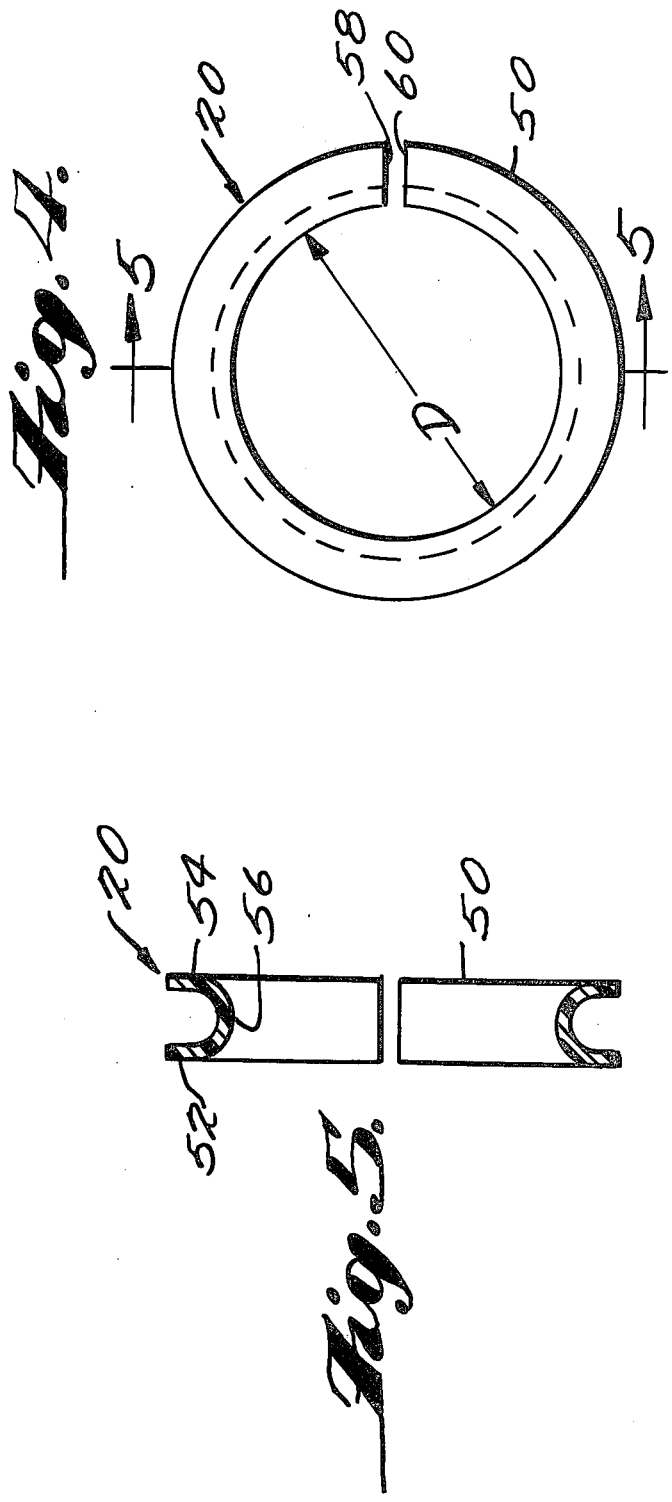

STAB-TYPE JOINT FOR SMOOTH END OR FLARELESS PIPE

The present invention relates to an improvement in joints for flareless or smooth wall pipes, the joint being of the "stab" type. While the joint of the present invention is primarily intended for plastic pipe such as polyethylene (PE), polyvinyl chloride (PVC), polybutylene (PB), and the like, it may also be used with flareless, smooth wall metal pipe such as copper or the like.

BACKGROUND OF THE INVENTION

The present invention is an improvement over the joint disclosed in U.S. Pat. No. 3,815,940 issued June 11, 1974 to Lawrence F. Luckenbill and assigned to the common assignee, Mueller Co., Decatur, Illinois. In the aforementioned patent, the joint disclosed obviated certain problems in prior "stab" type joints for flareless or smooth end pipe. More particularly the joint in the aforementioned patent had a split gripper ring which was adapted to be contracted tightly about the pipe after the pipe had been stabbed into the body member and when the pipe was subjected to pull-out which moved or tended to move the pipe outwardly of the body member. The initial grip on the pipe by the gripper ring was provided by the particular configuration of the gripper ring and, more specifically, by the configuration of the plurality of axially spaced teeth on the interior cylindrical surface of the gripper ring. In this respect, the annular split gripper ring of the aforementioned patent was provided with a plurality of axially spaced teeth on its interior cylindrical diameter, the teeth being so designed that at least the teeth at or adjacent the ends of the gripper ring always had contact with the exterior of the pipe and initially bit into the pipe upon stabbing of the pipe into the joint. By such an arrangement, there could be no rocking of the gripper ring as would occur in those situations where the gripper ring was molded so as to supposedly have complete engagement of all teeth, but because of manufacturing tolerances resulting during molding, only the intermediate teeth made contact to initially grip the ring, thus, causing the rocking which resulted in slippage when an outward pull was placed on the pipe.

The manufacturing cost for the gripper ring of the type disclosed in the aforementioned patent is high and additionally the quality control in manufacturing must be strictly adhered to. It would be more desirable to manufacture a split gripper ring wherein the design of the teeth was such that upon initial contact, caused by stabbing of the pipe, all teeth would engage the pipe. However, as mentioned above, manufacturing tolerances cannot be controlled this accurately and while some gripper rings made according to this method would be satisfactory, others made from the same molds would not operate satisfactory and consequently the design of gripper rings of the aforementioned patent resulted.

While the joint of the aforementioned patent has proved very satisfactory in most instances of operation, it has been found that problems do exist in such a joint resulting from its design. In the design of the joint of the aforementioned patent, the gripper ring is located against the sealing ring and the relationship between the inside diameter of the body member and the gripper ring's outside diameter is such that there is actually no or little resultant dimensional interference at the time of stabbing of the pipe and therefore the initial gripping is due almost solely to the stiffness of the gripper ring. Since the extent of initial grip is of utmost importance and since the amount of rigidity or stiffness of the gripper ring is limited, the initial grip is set off by a large dimensional interference grip to guarantee against unsatisfactory pull-out strength of the joint.

Additionally difficulties were encountered when using the joint of the aforementioned patent with pipe which was not particularly round at the time of stabbing. For example, polybutylene (PB) pipe becomes normally very out of round from coiling and when such pipe was stabbed into the joint of the type of the aforementioned patent it would sometimes pull out quite easily from the body member. This was caused because the initial grip by the gripper ring was inadequate due to lack of good engagement of its teeth on the out of round pipe. Also another disadvantage of this type of joint was caused by the out of round pipe, in some instances, engaging the sealing ring in a manner to push the sealing ring out from its seat thus ruining the effectiveness of the sealing ring.

Temperature and pressure extremes have affected the sealing characteristics of joints of this type in the past. For example, it has been found that joints of the prior art, even including the joint of the aforementioned patent, are susceptible to air leaks under certain circumstances when low temperatures (below 35° F) and low pressures (generally less than 10 psig) exist. Under normal conditions of temperature and pressure such joints operate satisfactory with no air leaks but when the pipe is flexed and when the joint has been in service for a considerable length of time and the resiliency of the O-ring has decreased from age, the O-ring becomes unseated and is not easily reseated since there is no positive load on the same in addition to the load upon which it is normally subjected by the pressure of the fluid in the system. This results in leaks on the joint.

PRIOR ART

Prior art relating to joints or coupling for flareless or smooth end pipes other than the aforementioned U.S. Pat. No. 3,815,940 are as follows:

| NUMBER | NAME | DATE |
|---|---|---|
| 2,017,994 | SPANG | Oct. 22, 1935 |
| 2,111,956 | BALDWIN | March 22, 1938 |
| 2,452,278 | WOODLING | Oct. 26, 1948 |
| 3,186,740 | LEE | June 1, 1965 |
| 3,600,010 | DOWNS, III ET AL. | Aug. 17, 1971 |
| British 880,495 | HARRIS ET AL. | Oct. 25, 1961 |
| Austrian 237391 | HAWLE | April 15, 1964 |

BRIEF SUMMARY OF THE INVENTION

The present invention relates to an improved joint for attaching the end portion of a smooth wall or flareless pipe to fittings or other pipes, the joint including a hollow body member having a passageway therethrough with an axially extending portion for receiving the end portion of the pipe, the axially extending portion having a bore defining a chamber with at least a frusto-conical portion extending inwardly from adjacent the outer end portion of the passageway. The frusto-conical portion of the bore has a minor diameter at its outer end adjacent the outer end of the passageway which is just large enough to receive the end portion of a pipe. A spring-like annular split gripper ring which has an axial extent less than the axial extent of the frusto-conical portion of the chamber in the body member is positioned within the same and the gripper ring also has a frusto-conical outer surface tapering in the same direction as the frusto-conical portion of the bore. The gripper ring has a cylindrical interior surface provided with gripping means thereon. An elastomeric sealing ring is positioned within the chamber of the body member and provides a seal between the exterior of the pipe and the interior of the passageway. Positioned between the elastomeric sealing ring and the spring-like annular split gripper ring is a menas normally flexibly urging the split gripper ring and the elastomeric sealing ring axially apart so as to position the gripper ring to have initial gripping contact with the pipe when the pipe is being inserted through the gripper ring as well as a continuing gripping contact after insertion. The means normally urging the gripper ring and the sealing ring apart also causes the sealing ring to be loaded at the time of and then continuously after insertion of the pipe into the body member.

The above-described joint results in the gripper ring being initially maintained more towards the outer end of the passageway whereby it has a smaller dimension to provide a large radially inwardly force upon the pipe from a large dimensional interference. This results in additional initial gripping of the pipe over and above the holding force of the gripper ring due to the stiffness of the gripper ring. As a result, satisfactory initial gripping is achieved with less dependence on gripper ring stiffness, tooth condition and configuration, pipe surface condition, pipe hardness and ovality, dimensional variations, and the like. By providing a positive load on the sealing ring or O-ring both prior to and after initial insertion of the pipe the present invention obviates difficulties encountered with insertion of out of round pipe and/or with low temperature and low pressure after pipe insertion and when the pipe is subsequently flexed. Also, the present invention is less susceptible to creep effects. Plastic creep, even under small loads, becomes more noticeable at temperatures of 100° F and higher. Because of the load applied both to the gripper ring and to the sealing ring, the strength of grip by the gripper ring is not affected by creep and the sealing characteristics of the sealing ring are not affected by pipe creep as both elements are continuously loaded.

Another aspect of the present invention is to utilize an axially flexible split spring ring as a means for axially urging the gripper ring and the sealing ring apart. The split spring ring may be a separate element positioned between the gripper ring and the sealing ring or it may be made integral with the larger end of the gripper ring and abut the sealing ring.

Still another aspect of the present invention is to utilize an axially extending flexible projection integrally formed on the sealing ring and engaging the gripper ring as the means for flexibly urging the gripper ring and the sealing ring apart. The sealing ring may be made of a softer material than the integral axially extending flexible projection.

BRIEF DESCRIPTION OF THE DRAWINGS

FIG. 1 is a longitudinally extending vertical sectional view, partly in elevation, through a joint of the present invention, the view illustrating the insertion of the pipe into the body member to a position abutting the shoulder or step of the body member.

FIG. 2 is an end elevational view of the joint of FIG. 1 looking from the left to the right thereof.

FIG. 3 is a sectional view taken substantially on the line 3—3 of FIG. 1.

FIG. 4 is an enlarged side elevational view of the axially flexible split spring ring used in the joint of FIG. 1.

FIG. 5 is a sectional view of the split spring ring of FIG. 4 taken substantially on the line 5—5 thereof.

DETAILED DESCRIPTION OF THE INVENTION

Figure 6:
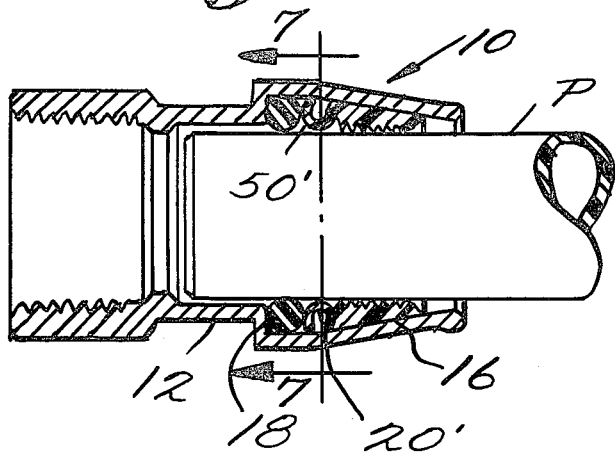
FIG. 6 is a longitudinally extending vertical sectional view, partly in elevation, through a modified joint of the present invention wherein split spring ring overlaps.

Referring now to the drawings wherein like characters or reference numerals represent like or similar parts, there is disclosed in FIGS. 1–5 inclusive a joint of the present invention, generally designated at 10. The joint 10 is used for attaching smooth wall or flareless pipe P to a fitting or another pipe, the pipe P being a plastic pipe such as polyethylene (PE), polyvinyl chloride (PVC), polybutylene (PB) and the like or the pipe P may be metal pipe such as copper or the like.

Broadly, the joint 10 includes a hollow body member 12 having a passageway 14 extending therethrough, an annular split gripper ring 16 positioned within the passageway 14 for gripping the end portion of the pipe P, an annular elastomeric sealing ring 18 also positioned within the passageway inwardly of the split gripper ring and means, generally designated at 20 positioned between the split gripper ring 16 and the sealing ring 18 urging the same axially apart so that both have a continuous load thereon during and after insertion of the pipe P. The hollow body member 12 is provided with a hexagonal end portion at one end thereof, as indicated at 22 and the through passageway 14, in the area or zone of the hexagonal end portion 22 is interiorly threaded as indicated at 24 for receiving the exteriorly threaded end of the pipe P' shown in broken lines. Of course, the end portion 22 of body member 12 could be exteriorly threaded rather than hexagonal in shape and, in this situation, the pipe to which it is connected would be interiorly threaded. The end portion 22 of the body member 12 as illustrated, is merely representative of one form of the body member for the purpose of the present description. Those skilled in the art will understand the end portion 22 could be connected to a fitting such as a valve body or a valve stop or actually be the fitting such as a valve body or valve stop or a fitting acceptable for connection to a tank or the like. Additionally, the end portion 22 could be identical to the joint 10, to be described, so that the joint in effect couples two smooth wall or flareless pipes to each other.

The passageway 14 is provided with an axially extending end portion 26 for receiving the end portion of the pipe P, the end portion 26 in the embodiment shown extending from the end of the threads 24 outwardly to the end of the body member 12. In more detail the axially extending end portion 26 is defined by a transversely extending annular shoulder 28 facing outwardly, the shoulder having an interior diameter less than the outside diameter of the pipe P so that it provides a stop means for the pipe P when the pipe P is inserted stabbed into the body member 12. A cylindrical bore 30 having a diameter at least as great as the diameter of the pipe P extends from the shoulder 28 outwardly and terminates in an annular wall 32 which is the inner end of a bore 34 extending from adjacent the outer end of the body member 12. The bore 34 has a diameter at its outer end 36 which is at least as great as the outside diameter of the pipe P and the bore 34 has a frusto-conical portion 38 extending from the outer end 36 and terminating at its larger end in a cylindrical portion 40 terminating at the annular wall 32. Bore 34 together with the exterior of the pipe P defines a chamber 42 which receives in series the gripper ring 16, the means 20 and the sealing ring 18. It will be noted that the frusto-conical portion 38 of the bore 34 has a minor diameter just slightly greater than the outside diameter of the pipe P and a major diameter at its inner end which is considerably larger than the diameter of the pipe P.

The split gripper ring 16 is of the general design disclosed in the aforementioned U.S. Pat. No. 3,815,940 and to this extent, the subject matter of this patent is incorporated herein by reference. In slightly more detail, the gripper ring 16 is provided with a frusto-conical outer surface 44 and with gripping means 46 on its interior cylindrical surface. The gripping means 46 which is disclosed as axially spaced teeth 48 does not have to have the same tooth configuration as described in the aforementioned U.S. Pat. No. 3,815,940. The teeth may be integral with the ring or provided as one or more separate inserts on the gripping means 46 or gripping means 46 may be other types of friction surfaces which will satisfactorily grip the pipe P.

The sealing ring 18 may likewise be of the type described in the aforementioned U.S. Pat. No. 3,815,940 and it is initially dimensioned in its relaxed condition so that it has a radial thickness sufficient to provide an immediate positive interference with the cylindrical portion 40 and the exterior of the pipe P when the pipe is inserted. Of course, the inside diameter of the sealing ring 18 is less than the outside diameter of the pipe P so that it has to be stretched when the pipe P is initially inserted therethrough.

The means 20, which is positioned between the gripper ring 16 and the sealing ring 18 to urge the same axially apart, is an annular split spring ring 50 that is axially flexible, the ring having a generally U-shaped configuration in radial cross-section defined by the spaced legs 52 and 54 connected by a base portion 56. The base portion 56 provides support for the end portion of the pipe P after joint make up, whereas the legs 52 and 54 are flexible and provide positive loads on the gripper ring 16 and sealing ring 18. Split spring ring 50 is preferably made of a flexible plastic material such as Celcon, although it can be made of a resilient metal, and it is thinned walled so that it is axially flexible when positioned between the gripper ring 16 and the sealing ring 18. The overall axial extent of the gripper ring 16, spring ring 50 and sealing ring 18 when positioned in the chamber 42 is such that the spring ring 50 is actually sitting loosely without any axial interference. In its relaxed position the split spring ring 50 has an inside diameter D (FIG. 5) which is nearly equal to the outside diameter of the pipe P. The outside diameter of the spring ring 50 is such that it just engages or does not engage the wall of the bore 34 when the pipe P is inserted therethrough. The ends 58 and 60 of the spring ring 50 are spaced apart both in its relaxed and expanded positions.

When the pipe P is initially inserted into the body member 12, it will first enlarge the gripper ring 16 and move the gripper ring 16 toward the spring ring 50 and the sealing ring 18. However, the spring ring 50 which urges the gripper ring 16 towards the right of FIG. 1 and against the frusto-conical surface 38 maintains it in a very positive interference fit with the frusto-conical surface 38 of the bore 34 and, thus, provides excellent initial grip of pipe P. Continued movement of the pipe P through the split spring ring 50 and through the sealing ring 18 radially expands the same and when the end of the pipe P engages the shoulder 28, the joint is made up. If the pipe P has a force exerted thereon tending to pull the same from the body member 12, the gripper ring moves with the pipe toward the right of FIG. 1, thus, contracting more tightly about the pipe P to prevent withdrawal. Since the spring ring 50 is constantly urging the gripper ring 16 and the sealing ring 18 axially apart and these two elements are continuously loaded, the sealing ring 18 does not become unseated and leak. The continuous load on the gripper ring 16 accommodates for any creep in the gripper ring 16 due to age, temperature or disturbance of the pipe, thus maintaining a tighter grip on the pipe P in the body member 12.

Figure 7:
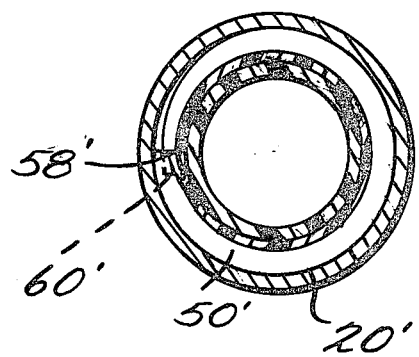
FIG. 7 is a sectional view taken substantially on the line 7—7 of FIG. 6.

Referring now to FIGS. 6 and 7 there is disclosed a modification of the joint 10 of FIG. 1, this modification being identified as 10'. The body member 12, gripper ring 16 and sealing ring 18 are identical to those elements described with regard to FIG. 1 and a description will not be repeated. The only difference is the arrangement shown in FIG. 6 which relates to the split spring ring which is identified as 50'. In this environment of the invention the spring ring 50' in its relaxed condition has ends which overlap sufficiently so that such ends 58' and 60' remain overlapped after insertion of the pipe P into the body member 12. As will now be evident the split spring ring 50' makes 360° contact with the sealing ring 18 and the gripper ring 16.

Figure 8:
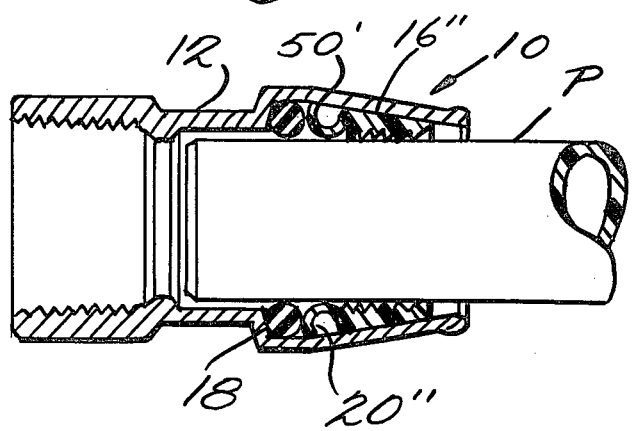
FIG. 8 is a longitudinally extending vertical sectional view, partly in elevation, through a still further modified joint of the present invention wherein the split spring ring is integrally formed on the larger end of the gripper ring.
Figure 9:
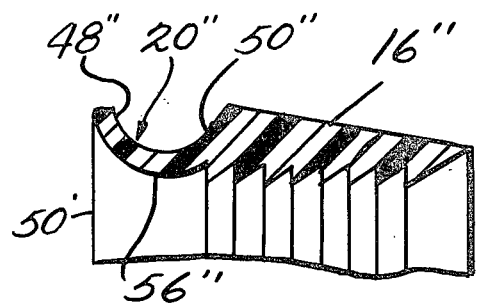
FIG. 9 is an enlarged fragmentary vertical sectional view of the FIG. 8 gripper ring having the split spring ring integrally formed thereon.

Referring now to FIGS. 8 and 9 there is disclosed still another modification of joint 10 of FIG. 1, this modification being identified as 10". Again, the body member 12 and the sealing ring 18 are identical to those elements described with regard to FIG. 1 and a further description will not be repeated. In the modification disclosed in FIGS. 8 and 9 the spring ring 50" is made an integral part of the gripper ring 16". In more detail the gripper ring 16" and the spring ring 50 are molded as a single unit with the leg 50" of the spring ring forming the end of the gripper ring 16". Both the gripper ring 16" and the spring ring 50" are split axially so that they can function similar to the gripper ring 16 and spring ring 50 of FIG. 1. In this modification the thin wall spring ring 50''' has its axial flexibility dependent solely on the leg 48'' connecting bottom or base portion 56'' and this axial flexibility can be controlled by the wall thickness in the radial direction. Operation of the joint 10'' is substantially identical to that of the joint 10'.

Figure 10:
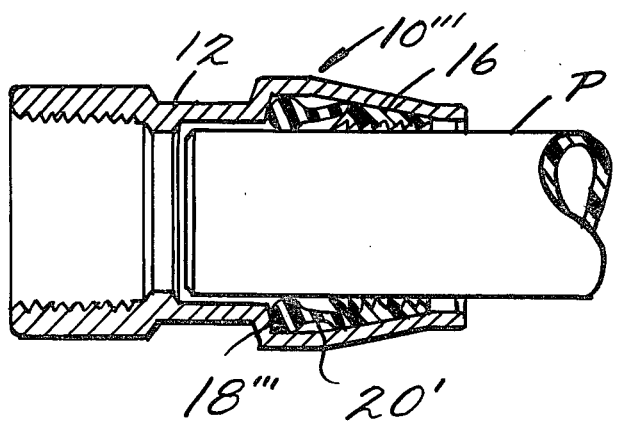
FIG. 10 is a longitudinally extending vertical sectional view, partly in elevation, through a still further modified joint of the present invention wherein the means urging the gripper ring and the sealing ring apart is formed integrally on the sealing ring.
Figure 11:
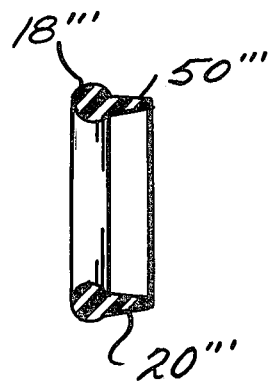
FIG. 11 is a vertical sectional view of the FIG. 10 sealing ring having integrally formed thereon an axially extended projection which functions as a means for separating the gripper ring from the sealing ring.

Referring now to FIGS. 10 and 11 there is disclosed still another modification of the joint 10 of FIG. 1, this modification being identified as 10'''. In this modification the body member 12 and gripper ring 16 are identical to those elements described with regard to FIG. 1, the difference being in the sealing ring 18''' and the means for axially urging the gripper ring 16 and the sealing ring 18''' apart so as to load each of the elements. Instead of utilizing a spring ring as the means 20 for flexibly urging the sealing ring and gripper ring axially apart, the modification of FIGS. 10 and 11 provide an axially extending flexible annular projection 50''' which is integrally formed on the sealing ring 18'''. The annular projection 50''' engages the larger end of the split gripper ring 16 and since it is flexible and resilient, it will urge the gripper ring 16 and sealing ring 18''' axially apart as shown in FIG. 10. In molding the sealing ring 18''' and the projection 50''' as a unit, it is desirable to mold the sealing ring portion 18''' of a softer elastomeric material than the projection 50''' for better sealing. The axially extending projection 50''' is molded of a harder material so as to provide it with sufficient stiffness although it is still flexible and resilient and will urge the gripper ring 16 and the sealing ring 18''' apart. While the projection 50''' is shown as a continuous annular projection, it could be made discontinuous such as a plurality of arcuately spaced axially extending projections.

Summarizing the advantages and objects of the present invention as disclosed in the arrangements described, there is substantially improved initial grip by the gripper ring due to the gripper ring being loaded in an axial direction to cause positive interference fit. Because of this loading of the gripper ring, there is more consistent and greater pull-out loads achieved on the made up joint since the grip is set firmer on the pipe at the time of pipe insertion. The sealing characteristics of the joint of the present invention, especially at low temperatures and low pressures, is substantially improved because the sealing ring also is positively and continuously loaded both during and after joint make up. The arrangement of the joint of the present invention preserves the easy stab-in feature as the means flexibly urging the gripper ring and sealing ring axially apart functions to provide a constant load thereon by a variable deflection device. Creep of the pipe is compensated for by the means flexibly urging the gripper ring and the sealing ring axially apart as the load on the pipe applied by the gripper ring will not diminish if there is creep due to the gripper ring being loaded axially. Surface condition of the pipe or out of roundness of the pipe is not critical as the spring ring helps rounding out the pipe when the pipe is being inserted while at the same time the spring ring maintains a load on the sealing ring to prevent the sealing ring from being unseated by the stabbing of the pipe. This arrangement makes stabbing substantially easier. Since the spring ring provides additional support for the pipe end after joint make up, the body member of the fitting can thus be made considerably shorter than prior units.

The terminology used in this specification is for the purpose of description and not limitation, the scope of the invention being defined in the appended claims.

What is claimed is:

1. An improvement in a joint for connecting an end portion of a smooth wall pipe to fittings or other pipes comprising:
    a hollow body member having a passageway therethrough with an axially extending portion for receiving the end portion of the pipe, said axially extending end portion of said passageway having a bore defining a chamber between the same and the wall of the pipe, said bore having a frusto-conical portion extending inwardly from adjacent the outer end of the end portion of said passageway, a cylindrical portion extending inwardly from the inner end of said frusto-conical portion and an annular wall at the inner end of said cylindrical portion, said annular wall defining an inner end of said chamber and said annular wall having an inner diameter at least as great as said pipe's outside diameter whereby said pipe may pass inwardly thereof, said frustoconical portion having a minor diameter at its outer end large enough to receive the end portion of said pipe and a major diameter at its inner end from which said cylindrical portion extends;
    a spring-like annular split gripper ring having an axial extent less than the axial extent of said frusto-conical portion, said ring having a frusto-conical surface tapering in the same direction as the frusto-conical portion of said bore and a cylindrical interior surface provided with pipe gripping means thereon;
    an elastomeric fluid pressure activated sealing 0-ring member positioned within said chamber between said cylindrical portion and the exterior of said pipe and providing a seal between the exterior of said pipe and the interior of said passageway; and,
    means interposed axially between said split gripper ring and said elastomeric sealing O-ring and normally flexibly urging said split gripper ring and said elastomeric sealing O-ring axially apart with said sealing O-ring engaging said annular wall whereby said gripper ring contracts into initial gripping contact with said pipe when said pipe is inserted through said gripper ring an initially and then continuously applying an axial load on said sealing O-ring sufficient to cause radial sealing before and after being fluid pressure actuated, said last mentioned means being a resilient ring having a wall thickness substantially less than the radial spacing between said cylindrical portion of said bore and the exterior surface of said pipe.

2. A joint as claimed in claim 1 in which said resilient ring axially urging said gripper ring and said sealing O-ring apart is an axially flexible split spring ring positioned between said sealing O-ring and said gripper ring, said spring ring being generally U-shaped in radial cross-section.

3. A joint as claimed in claim 2 wherein said spring ring has ends which are circumferentially spaced from each other when the spring ring is relaxed and, when said ends abut, said spring ring has an inside diameter slightly less than the outside diameter of the pipe.

4. A joint as claimed in claim 3 wherein said spring ring is made from a high yield and high elongation plastic material such as Celcon.

5. A joint as claimed in claim 2 wherein said spring ring has ends which slidingly overlap when said spring ring is positioned in said chamber.

6. A joint as claimed in claim 5 in which said spring ring is made of a high yield and high elongation plastic material such as Celcon and the like.

7. A joint as claimed in claim 2 in which said spring ring is integral with the inner end of said gripper ring.

8. A joint as claimed in claim 1 in which said resilient ring interposed axially between and axially urging said gripper ring and said sealing 0-ring apart is an annular axially extending flexible projection integrally formed on said sealing O-ring and engaging said gripper ring.

9. A joint as claimed in claim 8 in which said axially extending projection extends from a means radious of said sealing O-ring.

10. A joint as claimed in claim 9 in which said sealing ring is softer than said axially extending projection.

11. A joint as claimed in claim 1 in which said pipe gripping means on the cylindrical interior surface of said gripper ring includes a plurality of axially spaced teeth extending substantially the entire axial extent of said gripper ring, said teeth being made of a harder material than the pipe.

12. A joint as claimed in claim 1 including stop means in said passageway inwardly of said annular wall for engaging the end of the pipe and limiting its inward movement.

13. A joint as claimed in claim 12 in which said gripping means on the cylindrical interior surface of said gripper ring includes a plurality of axially spaced teeth having a configuration to permit insertion of the pipe and prevent axial removal of the pipe.

14. A joint as claimed in claim 13 in which said resilient ring interposed axially between and axially urging apart said gripper ring and said sealing O-ring is a split spring ring having a U-shaped thin wall configuration in radial cross-section, said spring ring being axially flexible and radially contractible.

15. A joint as claimed in claim 13 in which said spring ring interposed axially between and axially urging said gripper ring and said sealing O-ring apart is an annular flexible projection integrally formed on said sealing 0-ring and extending axially into engagement with said gripper ring.

16. A joint as claimed in claim 15 in which said projection extends axially from a mean radius of the sealing O-ring 17. A joint as claimed in claim 16 in which said sealing 0-ring is softer than said axially extending projection.

18. A joint as claimed in claim 14 in which said split spring ring has one leg of its U-shaped thin wall configuration integral with the inner end of said gripper ring.

* * * * *